(12) United States Patent
Deeken

(10) Patent No.: US 8,182,868 B2
(45) Date of Patent: May 22, 2012

(54) ENCAPSULATION OF PARTICULATE CONTAMINATION

(75) Inventor: John S. Deeken, Longmont, CO (US)

(73) Assignee: Maxtor Corporation, Scotts Valley, CA (US)

( * ) Notice: Subject to any disclaimer, the term of this patent is extended or adjusted under 35 U.S.C. 154(b) by 0 days.

(21) Appl. No.: 12/708,883

(22) Filed: Feb. 19, 2010

(65) Prior Publication Data

US 2010/0178422 A1   Jul. 15, 2010

Related U.S. Application Data

(62) Division of application No. 10/574,680, filed on Jan. 9, 2004, now abandoned.

(60) Provisional application No. 60/438,820, filed on Jan. 9, 2003.

(51) Int. Cl.
*B05D 7/22* (2006.01)
(52) U.S. Cl. .................................. 427/230; 427/239
(58) Field of Classification Search ............... 427/230, 427/239
See application file for complete search history.

(56) References Cited

U.S. PATENT DOCUMENTS

| | | | |
|---|---|---|---|
| 3,069,387 A | 12/1962 | Allen et al. |
| 3,600,216 A | 8/1971 | Stewart |
| 3,814,156 A | 6/1974 | Bachmann et al. |
| 3,983,304 A | 9/1976 | Sekhon |
| 4,114,505 A | 9/1978 | Loeser et al. |
| 4,529,659 A | 7/1985 | Hoshino et al. |
| 5,221,170 A | 6/1993 | Duffy et al. |
| 5,355,832 A | 10/1994 | Loh et al. |
| 5,425,988 A | 6/1995 | Ogawa et al. |
| 5,447,799 A | 9/1995 | Loh et al. |
| 5,485,327 A | 1/1996 | Yanagisawa |
| 5,523,912 A | 6/1996 | Koriyama |
| 5,587,857 A | 12/1996 | Voldman et al. |
| 5,661,618 A | 8/1997 | Brown et al. |
| 6,025,307 A | 2/2000 | Chittofrati et al. |
| 6,461,998 B2 | 10/2002 | Lenti et al. |
| 6,617,762 B2 | 9/2003 | Kurano et al. |
| 6,636,387 B2 | 10/2003 | Kikkawa et al. |
| 6,661,618 B2 | 12/2003 | Fujiwara et al. |
| 6,665,150 B2 | 12/2003 | Smith |
| 6,729,819 B2 | 5/2004 | Wallace |
| 6,753,261 B1 | 6/2004 | Phan et al. |
| 6,776,171 B2 | 8/2004 | Carpenter et al. |
| 6,785,096 B2 | 8/2004 | Kuwajima et al. |
| 6,930,861 B2 | 8/2005 | Huha et al. |
| 2002/0030943 A1 | 3/2002 | Kikkawa et al. |
| 2002/0093766 A1 | 7/2002 | Wachtler |
| 2003/0090842 A1 | 5/2003 | Smith |
| 2003/0223154 A1 | 12/2003 | Yao |
| 2004/0070885 A1 | 4/2004 | Kikkawa et al. |
| 2004/0201926 A1 | 10/2004 | Hancer et al. |
| 2004/0223256 A1 | 11/2004 | Feng et al. |

OTHER PUBLICATIONS

"Sealing of Debris in N58 Slider Pockets," IBM Technical Disclosure Bulletin NN9212387, vol. 35, Issue 7, pp. 387-388, Dec. 1, 1992.*
Jeffrey B. Fortin, Ph.D., and Toh-Ming Lu, Ph.D., "Chemical Vapor Deposition Polymerization—The Growth and Properties of Parylene Thin Films," 2004, pp. 1-7, 41-55, 57-82 & 91-99, Kluwer Academic Publishers, US.
http://www.astp.com/coating/parylast.html.
http://www.paryleneengineering.com, 2010.
http://len.wikipedia.org/wiki/Parylene, Aug. 4, 2011.

* cited by examiner

*Primary Examiner* — William Phillip Fletcher, III
(74) *Attorney, Agent, or Firm* — Hall Estill Attorneys at Law

(57) ABSTRACT

A method for the encapsulation of contaminant particles on the surface of a component. The method includes encapsulating the contaminant particles with an organic coating such that the contaminant particles are immobilized. The coating enables the immobilization of particles having a particle size of less than 0.5 µm. The method is particularly useful in the manufacture of precision devices, such as disk drives.

25 Claims, 14 Drawing Sheets

ENCAPSULATION OF PARTICULATE CONTAMINATION

CROSS-REFERENCE TO RELATED APPLICATIONS

This application is a divisional of parent copending U.S. patent application Ser. No. 10/574,680 filed Jan. 9, 2004, now abandoned, which claims priority to U.S. Provisional Patent Application Ser. No. 60/438,820, filed on Jan. 9, 2003 and entitled "ENCAPSULANT FOR PARTICULATE CONTAMINATION", which is incorporated herein by reference in its entirety.

BACKGROUND OF THE INVENTION

1. Field of the Invention

The present invention relates to the encapsulation of contaminant particles on the surface of a component, such as a disk drive component. More particularly, the present invention relates to the isolation of particulate contamination by using an organic coating to encapsulate the particles.

2. Description of Related Art

Many components that are assembled into devices include particulate contamination on the surface of the component as a result of the manufacturing process. Often, this particulate contamination is composed of the same material as the component. For example, metallic components that are manufactured using various milling and/or cutting steps often contain particles of the metal on the component surface as a result of the manufacturing process.

Washing the components in a liquid washing operation can easily remove many of the larger particles from the component surface. Depending upon the nature of the component and other variables, washing operations are generally effective for removing particles having a size of greater than about 1 µm. Such particles can also be removed using chemical or electrochemical etching processes. For the fabrication of many devices, the removal of these larger particles is sufficient for assembly and proper operation of the device.

However, many devices are susceptible to damage as a result of smaller particles becoming loose and moving within the device. For example, disk drives adapted to store large amounts of data in a computerized system include one or more magnetic storage disks having a magnetic recording layer and a read/write head for writing and reading data to and from the recording layer. During operation, the read/write head floats in close proximity above the surface of the disk, often within 20 nanometers or less of the disk surface. As a result, the presence of very small particles on the disk surface can lead to read/write errors and the disk drive may be unusable.

The disk drive includes many other components in addition to the magnetic storage disk and the read/write head. The introduction of particulate contamination into the disk drive by these components can therefore render the disk drive unusable. Therefore, the particles should be removed prior to assembly of the device. As stated above the components can be washed in one or more washing steps, however, such washing steps are not able to remove very small particles, such as those having a size of less than 0.5 µm.

The particles can also be strongly adhered to the component so that the particles are immobilized and cannot move within the device. For example, there have been attempts to plate components with electroless nickel to immobilize the particles. However, the metal plating is relatively thick and can affect the physical dimensions of the component, rendering them unsuitable for the device.

There is a need for an improved method for immobilizing particulate contamination in such devices.

BRIEF SUMMARY OF THE INVENTION

According to one embodiment of the present invention, a method for encapsulating particles on a surface is provided. The method includes providing a component having at least a first surface where the first surface includes particles dispersed on the surface. At least a portion of the surface is coated with a polymer encapsulating coating when at least a portion of the particles are encapsulated on the surface by the coating. The component can be a disk drive component such as a disk spacer and actuator flex assembly, an E-block, a disk clamp or a screw.

According to another embodiment of the present invention, a method for encapsulating particles on a disk drive component is provided. The method includes providing a disk drive component having at least a first surface including particles having a size of not greater than 0.5 micrometers dispersed on the surface and coating the disk drive component with a polymer to form an encapsulating coating, wherein at least about 75% of the particles are encapsulated by the encapsulating coating.

According to another embodiment of the present invention, a disk drive component is provided. The disk drive component includes a unitary component body having at least a first surface, contaminant particles dispersed on the first surface and a polymer coating encapsulating at least a portion of the particles.

DETAILED DESCRIPTION OF THE INVENTION

The present invention is generally directed to a method for encapsulating particulate contamination on a surface using an encapsulating organic coating, such as a polymer coating. By encapsulating the particles on a component for a device, the particles become immobilized and are not able to contaminate other components of the device such as components that are susceptible to being damaged by the particles.

The present invention is particularly applicable to the components of a disk drive for the storage of data on a disk, such as a magnetic hard disk. Disk drives are highly susceptible to damage from contaminant particulates due to the small dimensions of the magnetic recording tracks and the low fly height of the read/write head.

Figure 1:
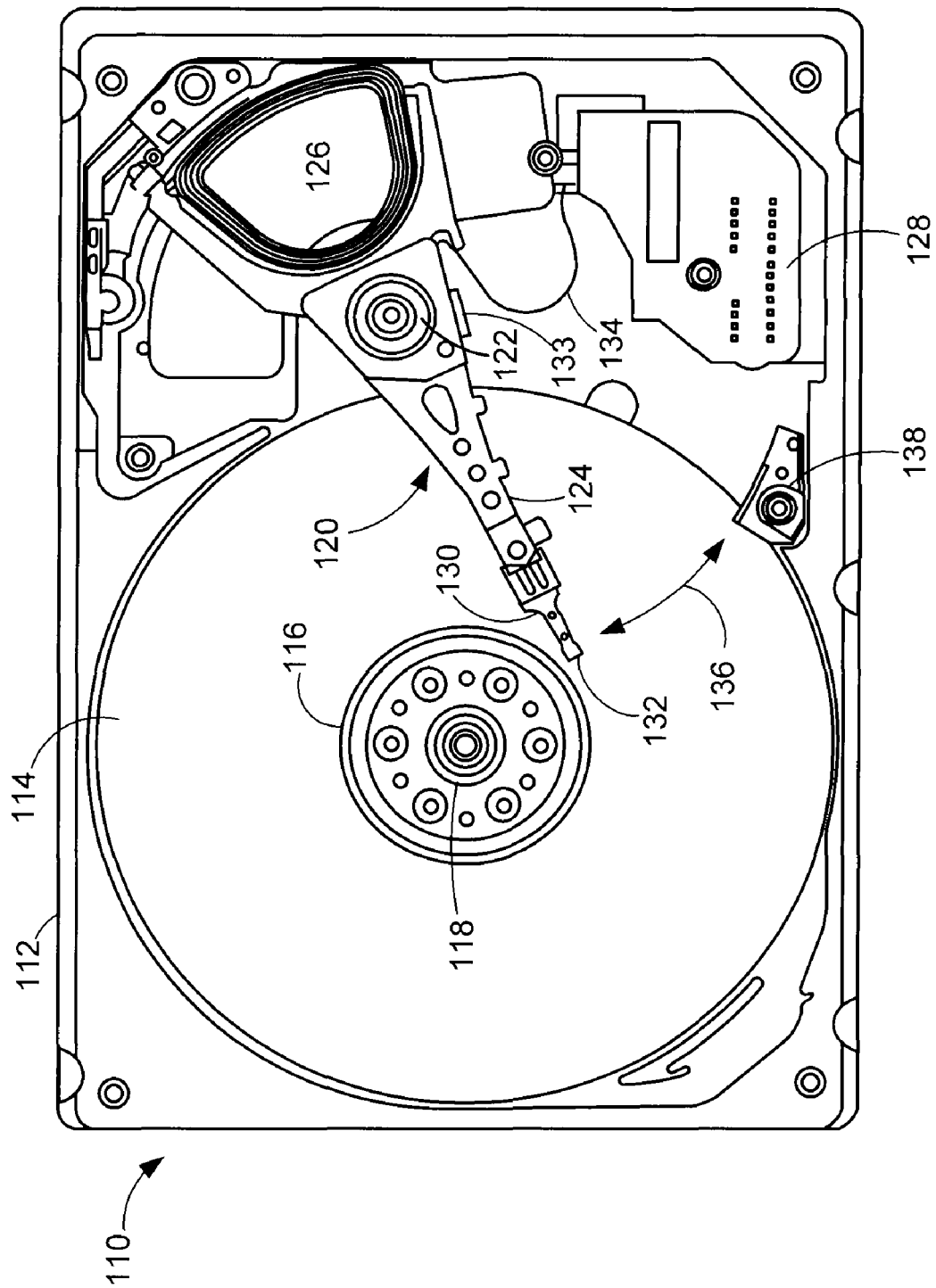
FIG. 1 illustrates a top plan view of a disk drive device.

FIG. 1 illustrates an example of a disk drive 110. The disk drive 110 generally includes a base plate 112 and a cover (not shown) that may be disposed on the base plate 112 to define an enclosed housing or space for the other disk drive components. The disk drive 110 includes one or more data storage disks 114 of any appropriate computer-readable data storage media. Typically, both of the major surfaces of each data storage disk 114 include a plurality of concentrically disposed tracks for data storage purposes. Each disk 114 is mounted on a hub or spindle 116, which in turn is rotatably interconnected with the disk drive base plate 112 and/or cover. Multiple data storage disks 114 are typically mounted in vertically spaced and parallel relation on the spindle 116. Rotation of the disk(s) 114 is provided by a spindle motor 118 that is coupled to the spindle 116 to simultaneously spin the data storage disk(s) 114 at an appropriate rate.

The disk drive 110 also includes an actuator flex assembly 120 that pivots about a pivot bearing 122, which in turn is rotatably supported by the base plate 112 and/or cover. The actuator flex assembly 120 includes one or more individual rigid actuator arms 124 that extend out from near the pivot bearing 122. Multiple actuator arms 124 are typically disposed in vertically spaced relation, with one actuator arm 124 being provided for each major data storage surface of each data storage disk 114. Other types of actuator arm assembly configurations include an E-block having one or more rigid actuator arm tips or the like that cantilever from a common structure. Movement of the actuator flex assembly 120 is provided by an actuator arm drive assembly, such as a voice coil motor 126 or the like. The voice coil motor 126 is a magnetic assembly that controls the operation of the actuator flex assembly 120 under the direction of control electronics 128.

A load beam or suspension 130 is attached to the free end of each actuator arm 124 and cantilevers therefrom. Typically, the suspension 130 is biased generally toward its corresponding disk 114 by a spring-like force. A slider 132 is disposed at or near the free end of each suspension 130. What is commonly referred to as the read/write head (e.g., transducer) is mounted on the slider 132 and is used in disk drive read/write operations.

The biasing forces exerted by the suspension 130 on its corresponding slider 132 move the slider 132 in the direction of its corresponding disk 114. Typically, this biasing force is such that if the slider 132 were positioned over its corresponding disk 114, without the disk 114 being rotated at a sufficient velocity, the slider 132 would be in contact with the disk 114.

The head on the slider 132 is connected to a preamplifier 133, which is interconnected with the control electronics 128 of the disk drive 110 by a flex cable 134 that is typically mounted on the actuator flex assembly 120. Signals are exchanged between the head and its corresponding data storage disk 114 for disk drive read/write operations. In this regard, the voice coil motor 126 is utilized to pivot the actuator flex assembly 120 to simultaneously move the slider 132 along a path 136 and "across" the corresponding data storage disk 114 to position the head at the desired/required radial position on the disk 114 for disk drive read/write operations.

When the disk drive 110 is not in operation, the actuator flex assembly 120 is pivoted to a "parked position" to dispose each slider 132 generally at or beyond a perimeter of its corresponding data storage disk 114, but in any case in vertically spaced relation to its corresponding disk 114. This is commonly referred to in the art as being a dynamic load/unload disk drive configuration. In this regard, the disk drive 110 includes a ramp assembly 138 that is disposed beyond a perimeter of the data storage disk 114 to typically both move the corresponding slider 132 vertically away from its corresponding data storage disk 114 and to also exert a retaining force on the actuator flex assembly 120. The disk drive 110 could also be configured to be of the contact start/stop type, where the actuator flex assembly 120 would pivot in a direction to dispose the slider(s) 132 toward an inner, non-data storage region of the corresponding data storage disk 114. Terminating the rotation of the data storage disk(s) 114 in this type of disk drive configuration would then result in the slider(s) 132 actually establishing contact with or "landing" on its corresponding data storage disk 114, and the slider 132 would remain on the disk 114 until disk drive operations are re-initiated.

The slider 132 of the disk drive 110 may be configured to "fly" on an air bearing during rotation of its corresponding data storage disk(s) 114 at a sufficient velocity. The slider 132 may be disposed at a pitch angle such that its leading edge is disposed further from its corresponding data storage disk 114 than its trailing edge. The read/write head would typically be incorporated on the slider 132 generally toward its trailing edge since this is positioned closest to its corresponding disk 114. Other pitch angles/orientations could also be utilized for flying the slider 132.

Figure 2:
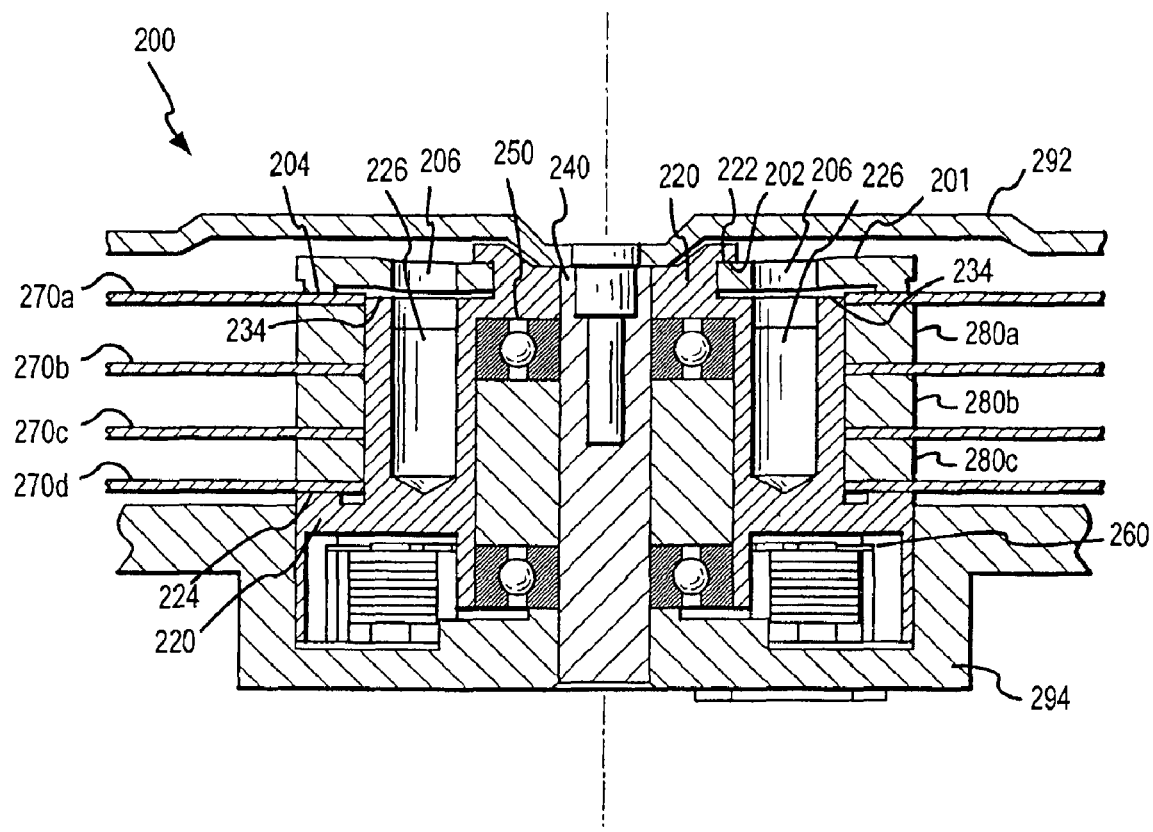
FIG. 2 illustrates an exploded perspective view of the components of a disk drive device.

FIG. 2 illustrates a side view of a disk drive 200. The disk drive 200 includes a drive spindle 220 disposed about a central shaft 240 with a bearing assembly 250 interposed therebetween to facilitate driven rotation of spindle 220 relative to shaft 240. To provide for such drive rotation, a motor assembly 260 is disposed for operation interface with spindle 220.

A plurality of storage disks 270a-270d are disposed about spindle 220 in a stacked fashion on a lower shelf 224 of the spindle 220. Disks 270a-270d are axially spaced via disk spacers 280a-280c interposed therebetween. A disk clamp 201 is disposed about a top end of drive spindle 220 to cooperatively maintain storage disks 270a-270d in fixed relation to spindle 220. Disk clamp 201 may include a plurality of apertures 206 aligned with a common plurality of holes 226 provided in an upward facing top shelf 234 of spindle 220. Apertures 206 and holes 226 are provided for selective receipt of balancing weights.

A disk drive housing is defined by an upper housing member 292, and lower housing member 294. As illustrated, lower housing member 294 may include a cupped region shaped to receive motor assembly 260 and bottom portions of spindle 220 and bearing assembly 250. It will be appreciated that disk drive 200 will also include a number of additional components, including for example, read/write heads mounted on corresponding arms with an actuator interface to facilitate selective positioning of the heads between storage disks 270a-270d for read/write operations.

As noted, spindle 220 and disk clamp 201 are disposed to provide an operative interface that yields enhanced clamping of the disks 270a-270d relative to spindle 220. In this regard, it can be seen that disk clamp 201 is axially restrained in a predetermined axial position relative to spindle 220 via a mechanical interface therebetween. More particularly, a downward-facing lip surface 222 of spindle 220 is disposed to restrainably engage an upward-facing inner surface 202 of disk clamp 201. Relatedly, a downward-facing, outer surface 204 of disk clamp 201 is disposed to contact and apply a clamping force to the top surface of storage disk 270a. Such clamping force is communicated through the stack of disks 270a-270d and interposed disk spacers 280a-280c to the upward-facing ledge surface 224 of the spindle 220. The defined clamping arrangement yields a reliable, fixed interconnection between disks 270a-270d and spindle 220, while maintaining the desired flatness of disks 270a-270d.

Bottom surface 204 is disposed to provide for the uniform application of clamping forces to the top disk 270a. More particularly, the bottom, outer surface of disk clamp 201 is provided for flush, face-to-face engagement with the top disk 270a. Further, the bottom surface 204 may be provided to extend continuously about spindle 220.

Figure 3:
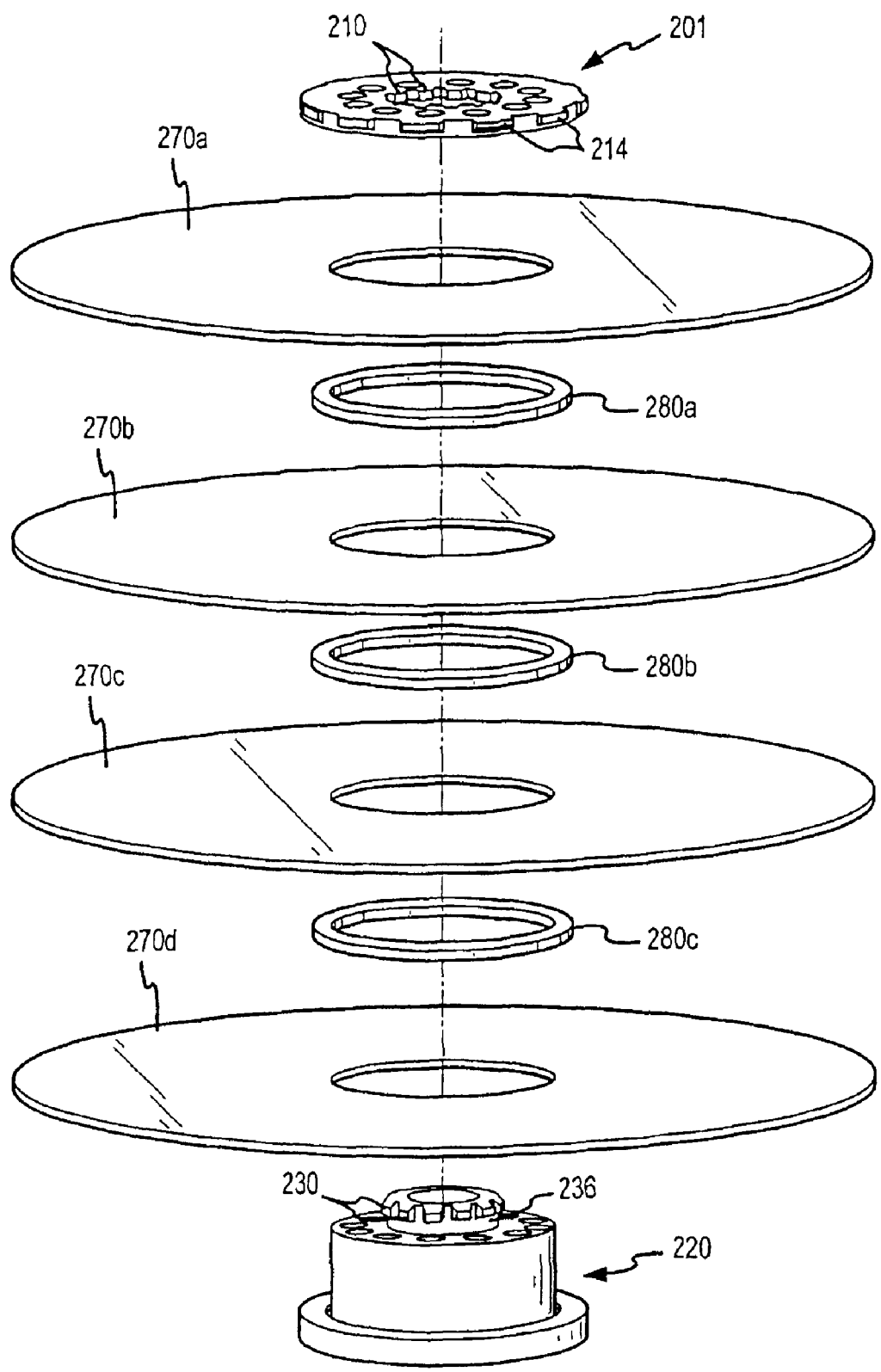
FIG. 3 illustrates an exploded assembly view of various components of a disk drive device.

FIG. 3 is an exploded view that illustrates how the spindle 220 and disk clamp 201 may be implemented in the disk drive arrangement shown in FIG. 2. In particular, following positioning of spindle 220 within the lower housing 294 (not shown in FIG. 3), disk 270d, disk spacer 280c, disk 270c, disk spacer 280b, disk 270b, disk spacer 280a, and disk 270a may be sequentially aligned and axially advanced for positioning about the top end 228 of spindle 220. Thereafter, tabs 210 and recesses 212 of disk clamp 201 may be oriented and axially advanced relative to the recesses 232 and tabs 230, respectively, at the top end of spindle 220, so that tabs 210 will pass through recesses 232.

As is illustrated above, the present invention is particularly applicable to a number of disk drive components including, but not limited to, disk clamps, disk spacers, actuator flex assemblies, E-blocks, base plates, covers and screws. Various disk drive components are illustrated in U.S. Pat. No. 5,208,712 by Hatch, et al. (general illustration of a disk drive); U.S. Pat. No. 6,304,412 by Voights (disk clamp and disk spacer); U.S. Pat. No. 6,563,668 by Suwito (disk clamp, screw and disk spacer); U.S. Pat. No. 6,563,676 by Chew et al. (actuator); and U.S. Pat. No. 6,538,853 by Williams et al. (E-block). Each of the foregoing U.S. patents is incorporated herein by reference in its entirety.

Disk drive devices such as those illustrated above are fabricated by assembling the individual components, which are typically acquired from multiple vendors. It is evident that particulate contamination that is carried into the assembled disk drive on the individual components, such as the disk spacers or disk clamps, can become dislodged during assembly or use of the disk drive and can come into contact with the surface of the storage disk and potentially render the disk drive device unusable.

According to the present invention, the component includes a unitary body having at least a first surface, where the first surface includes particulate contamination thereon. The component can be fabricated from a wide variety of materials. According to one embodiment, the material is a metallic material, such as aluminum (including aluminum alloys) or stainless steel. The component can also be fabricated from plastics or ceramics such as aluminum oxides (e.g., $Al_2O_3$), as well as carbon-based materials and composite materials such as fiber reinforced composites.

As a result of manufacturing operations and handling of the components particulate contamination is found on the surface of the components. Contaminant particles having a size (i.e., diameter) of greater than about 1 μm can usually be removed using common aqueous or non-aqueous washing techniques. However, smaller particles, particularly those having a size of not greater than about 0.5 μm, are more difficult to remove due to electrostatic forces and other forces that adhere the particles to the surface. The components received from a manufacturer frequently include large numbers of such contaminant particles on the component surface. For example, manufactured metallic components often include greater than 76,000 particles having a size of not greater than 0.5 μm per square centimeter of surface area (particles/$cm^2$).

The contaminant particles can have the same or a substantially similar material composition as the unitary body of the component. According to one embodiment, the component is a metallic component including a metallic surface and the contaminant particles are metallic particles. For example, components fabricated from aluminum frequently include aluminum particles on the surface of the component. Due to surface oxidation, the metallic components can also include contaminant metal oxide particles.

It will also be appreciated by those skilled in the art that the component surface is not perfectly smooth and can have recessed surface features (e.g., pits or scratches) on the component surface. Such surface features can result from grinding and polishing operations used during manufacture, as well as from routine handling of the components. It has been found that contaminant particles, particularly those having a size of not greater than about 0.5 μm, tend to segregate within these surface features on the component surface.

According to the present invention, the contaminant particles are encapsulated (i.e., immobilized) on the surface of the component by applying a thin encapsulating coating on the surface. By immobilizing the particles, the particles cannot migrate to other parts of the device that are more susceptible to being damaged by the particles. The coating is a non-metallic coating and preferably is an organic coating. Particularly preferred according to the present invention is the use of a polymer encapsulating coating on at least a portion of the component surface to encapsulate at least a portion of the contaminant particles thereon. According to the present invention, the encapsulating coating is chemically bound to the surface of the component and therefore is well adhered to the surface and is physically robust.

The encapsulating coating according to the present invention is preferably a functional coating, such as an epoxy function polymer coating or a vinyl functional polymer coating. Examples of epoxy functional polymer coatings include diglycidyl cyclohexane dicarboxylate and polyethylene glycol diglycidyl ether. Particularly preferred are perfluorinated polymers, such as a perfluorinated siloxane that includes perfluorinated groups and silanol groups.

It is also preferred that the encapsulating coating reduce the surface energy of the component surface, so that any particles subsequently deposited on the surface can be easily removed. Particular examples of coatings having reduced surface energy include perfluorinated epoxies and functionalized silicone polymers.

It is also preferred that the coating is cross-linked such as by heating (curing) the coating and/or by the addition of a cross-linking agent. Cross-linking increases the physical robustness of the encapsulating coating, which is particularly important in the event that the device is re-worked. That is, a device that is determined to be defective may be disassembled, repaired and reassembled by the manufacturer. A polymer coating that is not cross-linked may be susceptible to damage during re-working of the device.

It is preferred according to the present invention that the encapsulating coating be applied to the component surface in a very thin layer. It is particularly preferred according to one embodiment that the encapsulating coating have essentially no effective thickness. According to this embodiment, the application of the coating is controlled such that the coating deposits within the recessed surface features on the component surface, but is not sufficiently thick to coat the entire component surface. Since the contaminant particles preferentially segregate to the recessed surface features, as is discussed above, a majority of the contaminant particles will be encapsulated by the coating. Further, by depositing the coating only into the recessed surface features, the contaminant particles are advantageously encapsulated without substantially affecting the bulk dimensions of the component. For metallic materials used in electronic devices, the component surface will also be partially exposed to maintain a conductive path so that electrical charge will not build up on the component.

According to another embodiment, the coating is a low surface energy coating (e.g., perfluorinated epoxies or functionalized silicone polymers) that enhances the lubricity of the component. For example, the coating can be applied to the threads of a screw to enhance the clamping force that results from a given amount of applied torque. For the enhancement of lubricity, it is preferred that the coating have a sufficient thickness to form a substantially continuous coating on the surface.

According to the present invention, the coating material can be applied to the component surface using a solution of the coating material or a precursor to the coating material. The precursors preferably include reactive monomeric or oligomeric precursors. According to one embodiment, the coating solution includes not greater than about 15 weight percent polymer or polymer precursor, such as from about 5 weight percent to 10 weight percent polymer or polymer precursor. According to one embodiment, one or more monomers are polymerized, purified and put into the coating solution. Alternatively, one or more monomers or oligomers can be put into solution and can be heated (cured) after deposition for polymerization. Preferred solvents can include isopropanol, ethanol and fluorinated solvents. The encapsulating coating can be deposited from the solution using any known technique, such as dip-coating or spraying and the average thickness of the coating can be controlled by varying the concentration of the coating solution.

According to one embodiment of the present invention, a coupling agent is applied to the surface of the component prior to application of the encapsulating coating. As used herein, a coupling agent is any chemical compound that is capable of chemically reacting or bonding to the component surface to achieve a coupling effect between the surface and the encapsulating coating deposited over the coupling agent. Coupling agents are used, for example, to bind organic materials to inorganic substrates.

The coupling agent according to the present invention can be, for example, a metal alkoxylate such as a titanate, zirconate or silane. Substituted metal alkoxylates have the general formula:

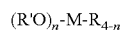

where: M=Zr, Ti, Si, Al, Ge or Sn; R'=ethyl or methyl; and R=substituted alkyl group such as an amino, mercapto or glycidyl ether.

The reaction of a metal alkoxylate generally involves four steps. Initially, hydrolysis of the alkoxylate groups (R'O—) occurs. Then, if n>2, the hydrolyzed metal alkoxylate can condense to form oligomers, which then hydrogen bond to Lewis base sites on the component surface. In the case of an aluminum component, $Al_2O_3$ forms naturally on the surface and is amphoteric and hydrogen bonding occurs with the $Al_2O_3$ on the surface. Finally, during drying or curing, a covalent bond is formed with the surface accompanied by the loss of water.

The coupling agent can be deposited on the component by contacting the component with a solution containing the coupling agent, for example by dip-coating the component. The thickness of the deposited coupling agent is determined by the concentration of the coupling agent in the solution. In order to effect a change in surface chemistry, the deposition of a monolayer is desired. However, multilayer absorption results from the solutions that are typically used. The layers can be interconnected through a network structure or can be loosely intermixed.

The orientation of the functional groups (R—) is dependent on the length of the carbon chain on the R-group and the concentration of the solution. If the carbon chain is long enough, and there are vacant sites on the surface, the functional group can form a loop structure with the surface so that methylene groups are presented to the surface. In this way, the surface moves to a lower energy state. If the concentration of the coupling agent is high and the carbon chain is short, such that the loop structure is sterically prohibited, the functional groups will orient in a direction normal to the surface.

To be useful in the production environment, the metal alkoxylate coupling agents must be soluble in readily available, acceptable solvents. Most of the available coupling agents are soluble in water, however, the coupling agents will begin to polymerize with themselves in the presence of water. Therefore water is a suitable solvent only if the coating tank can be continuously refreshed with coupling agent, which is a cost prohibitive manner of coating. Other solvents can include, for example, acetone, isopropyl alcohol (IPA) and ethyl acetate. Other additives, such as acetic acid, can be added to the solvent if necessary to increase the rate of the hydrolysis reaction.

Alternatively, the coupling agent can be a surface active agent capable of forming monolayers on the component surface. Examples of surface active agents include a mercaptan (i.e., a thiol such as ethane-thiol) or a tungstic acid derivative. The coupling agents covalently bond to the component surface through a functional group and also have available at least a second functional group that is concentrated at the surface of the coupling agent and is capable of chemically bonding to the subsequent encapsulating coating.

The encapsulating coating is then applied over the coupling agent at a thickness that is sufficient to cover the particulate contamination. The encapsulating coating preferably includes functional groups that are capable of chemically reacting with the functional groups on the surface of the coupling agent.

Several preferred combinations of coupling agents and encapsulating coatings are illustrated in Table I.

TABLE I

| COUPLING AGENT | COATING | REACTION MECHANISM |
|---|---|---|
| Mercaptopropyl Titanate | Epoxy Functional Coating | Condensation polymerization reaction |
| Vinylpropyl Silane | Vinyl Functional Coating | Chain polymerization reaction |
| Silicotungstic Acid | Epoxy Functional Coating | Ionic polymerization reaction |

The use of a coupling agent can advantageously increase the adhesion of the encapsulating coating by about 50% or more.

Although it is not believed to be necessary according to the present invention, it will be appreciated that the component can be subjected to one or more standard wash operations before applying the encapsulating coating, such as an aqueous wash or a non-aqueous wash. In addition, it may be desirable to wash the component after application of the encapsulating coating, for example to remove cyclic compounds that may be present on the coating surface.

The method of the present invention can dramatically increase the reliability of a device such as a disk drive by reducing particulate contamination within the device. According to one embodiment, at least about 75 percent of particles having a size of not greater than 0.5 µm are encapsulated by the encapsulating coating, and more preferably at least about 95 percent of particles having a size of not greater than 0.5 µm are encapsulated by the encapsulating coating. The coating is chemically bound to the component surface, thereby reducing the probability that the coating itself will contribute to contamination of the device. Further, the method for coating the components according to the present invention will not add significantly to the number of processing steps required to manufacture the component.

EXAMPLES

1. Cross-Linked Coatings

A first set of examples compares a cross-linked coating to a coating that is not crosslinked. The non-crosslinked coating (Coating A) is a high molecular weight polymeric acrylate (acrylic) coating. The crosslinked coating (Coating B) is an oligomeric perfluorinated siloxane coating that is crosslinked through a condensation mechanism.

Disk drive spacers are washed by dipping the components into isopropyl alcohol (IPA), drying them in air and then heating at 150° C. for 30 minutes. Thereafter, the components are dip coated into solutions containing the coating materials. The components are then air dried and cured at 150° for ten minutes. The particle count measurements for the components in the as-received condition, after IPA washing and after each of the two coatings is applied are illustrated in Table II.

TABLE II

| Sample | PARTICLE COUNT (<0.5 µm) | PARTICLE COUNT (0.5-1.0 µm) |
| --- | --- | --- |
| Control | 24328 | 2326 |
| IPA Wash Only | 24945 | 2148 |
| CoatingA | 35635 | 14239 |
| Coating B | 138 | 9 |

The particle count indicates the number of loose particles on the component surface and is measured by IDMA Standard M9-98 entitled "Particulate Contaminant Test Method for HDD Components." This technique generally includes placing the component in an ultrasonic bath, applying ultrasonic energy to the bath to dislodge particles from the component and measuring the number of particles within the bath by laser scattering.

The spacer that is coated with a cross-linked coating demonstrates a significant decrease in the number of contaminant particles having a size of less than 1 µm. The component that is simply washed in IPA does not show any significant improvement. The non-crosslinked coating is eroded by the ultrasonics and therefore shows an increase in the number of particles. This example demonstrates the advantage of using a cross-linked coating to encapsulate contaminant particles according to the present invention.

2. Low Surface Energy Coating

Coating B, described above, is a perfluorinated coating having a low surface energy. To demonstrate the advantage of a low surface energy coating, two disk spacers (Samples 2-1 and 2-2) are coated with Coating B substantially as described with respect to Example 1 above. Thereafter, the spacers are exposed to ambient laboratory conditions for two weeks, during which time contaminant particles redeposit on the spacers. Thereafter, the spacers are subjected to an aqueous wash to attempt to remove the particles. The results are illustrated in Table III.

TABLE III

| | Particle Count | | | |
| --- | --- | --- | --- | --- |
| | Clean Room Ready | As-Coated | Exposed | Aqueous Washed |
| Sample 2-1 | 2291 | 97 | 1340 | 93 |
| Sample 2-2 | 3022 | 47 | 1879 | 40 |

As Table III illustrates, the re-deposited particles are substantially removed by aqueous washing due to the low surface energy of the coating. This is particularly advantageous for components used in devices that may be re-worked after initial assembly.

3. Evaluation of Coupling Agents

Aluminum test pieces are stamped from AA 6010 sheet stock, tumble deburred and aqueous washed. Metal alkoxylates are mixed with IPA as the solvent and allowed to stand for five minutes before the pieces are coated. The aluminum pieces are dip-coated, allowed to drain, air dried and cured at 150° C. for 30 minutes. Cleanliness and contact angle testing are then performed. Adhesion testing is performed in accordance with ASTM D3165 at a strain rate of 0.1 in/min.

The adhesion of an epoxy adhesive is chosen as the measure of effectiveness of the coupling agent, and three coupling agents capable of reacting with the epoxy adhesive and forming covalent bonds are selected for evaluation. They are an amino propyl substituted titanate (Lica 44), a propyl glylcidyl ether substituted titanate (NA 44) and a mercapto propyl substituted titanate (NZ 66A).

Two aspects of the coupling agent affect the degree of adhesion—the thickness of the molecular layer and the degree of cross-linking the coupling agent achieves within itself. Therefore, three factors are chosen for the screening experiment—the coupling agent concentration, the curing temperature and the length of the cure. Test pieces are coated in solutions of the titanate coupling agent in IPA at various concentrations ranging from 0.01% to 1.00%. The pieces are then air dried and cured at the specified time and temperature. The pieces are then coated with EMCAST 615 (an epoxy adhesive available from Electronic Materials Inc., Breckenridge, Colo.) and are cured for two hours at 165° C.

Figure 4:
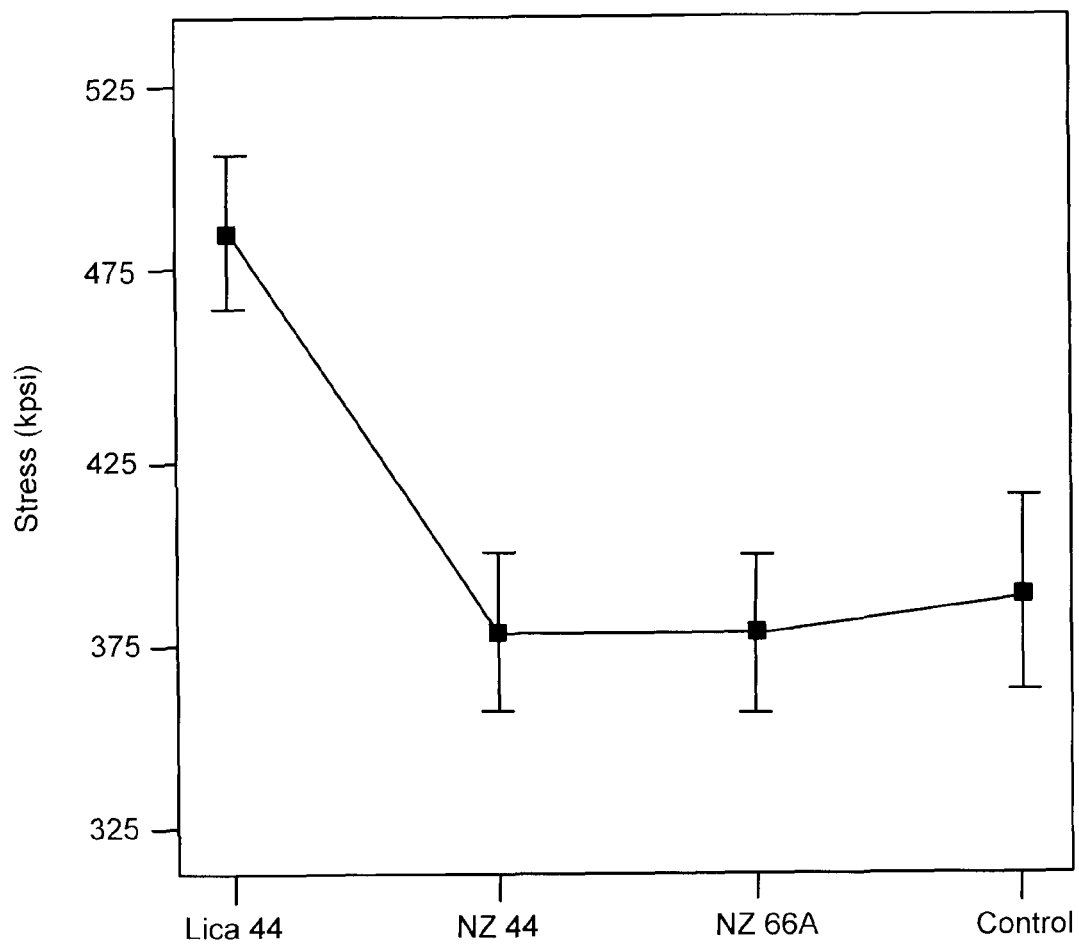
FIG. 4 illustrates the adhesive stress of an encapsulating coating as a function of the type of coupling agent.

As is illustrated in FIG. 4, the amino propyl substituted titanate (Lica 44) improves the adhesion of the epoxy adhesive to the aluminum substrate, whereas the other coupling agents did not show an improvement in adhesion over the control sample.

The lack of improvement for NZ 44 and NZ 66A is due to a lack of reactivity during the first step of the reaction sequence, namely the hydrolysis of the alkoxy group. This step is either acid or base catalyzed. In the case of the amino propyl substituted titanate, the amine group catalyzes the hydrolysis reaction, and there is enough water present in the reagent grade IPA to complete the reaction. The other coupling agents are not capable of self-catalyzing. However, it is found that when 2 ml of a 5% acetic acid solution is added to the propyl glycidyl ether substituted titanate (NZ 44) in order to catalyze the hydrolysis step in the reaction sequence, the resulting adhesive stress increases from 377 kpsi to 456 kpsi.

With respect to temperature, the coated pieces must reach a minimum temperature of about 90° C. to cure the coupling agent. Once the threshold of 90° C. is reached, however, the temperature is an insignificant factor in determining adhesion. That is, increasing the temperature does not lead to any improvements in adhesion.

Figure 5:
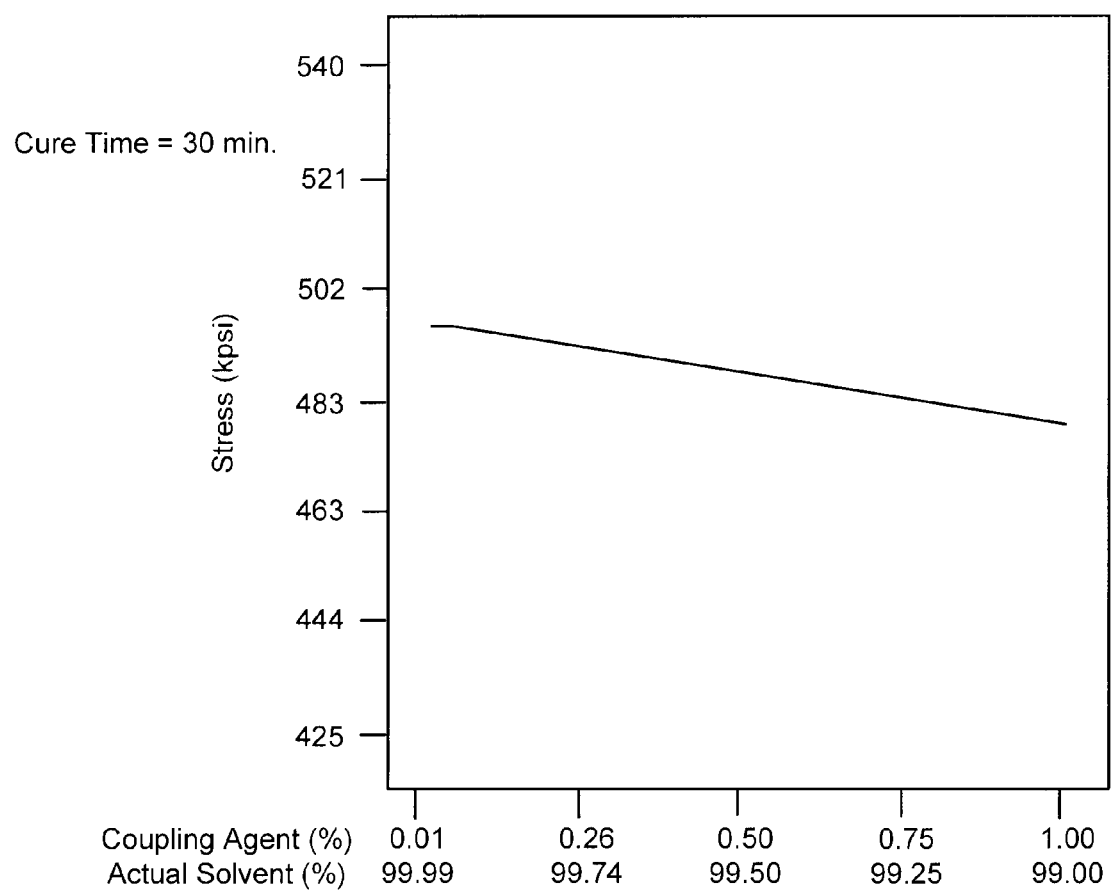
FIG. 5 illustrates the adhesive stress of an encapsulating coating as a function of coupling agent concentration.

There is a correlation between the coupling agent concentration and the required cure time. Lower concentration solutions, and therefore, thinner titanate layers, provide about the same level of adhesion improvement at short cure times as the higher concentration solutions. This is illustrated in FIG. 5, which illustrates the adhesive strength as a function of coupling agent concentration at a cure time of 30 minutes and a temperature of 150° C.

Figure 6:
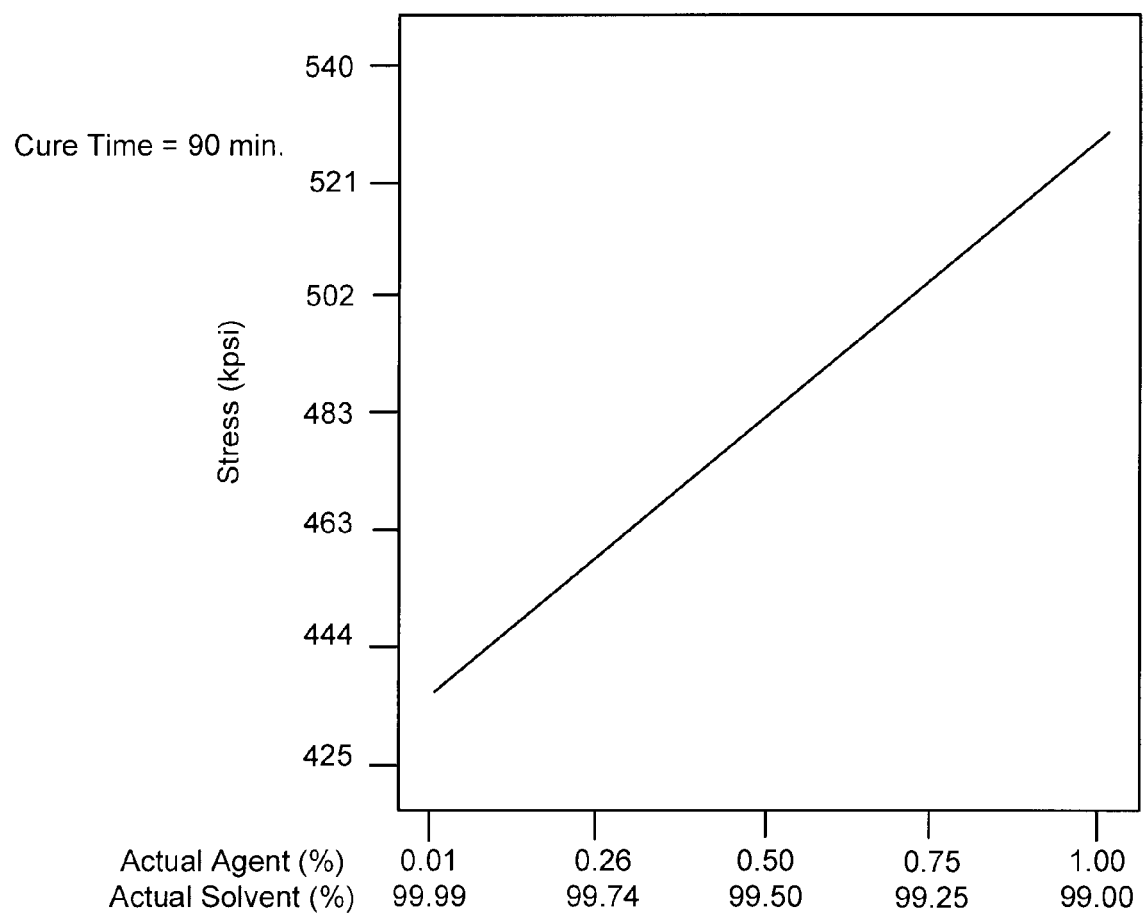
FIG. 6 illustrates the adhesive stress of an encapsulating coating as a function of coupling agent concentration.

At the higher concentrations, however, the coupling agent requires a longer cure time in order to form a more complete network. This is illustrated in FIG. 6, which shows the adhesive strength as a function of coupling agent concentration at a cure time of 90 minutes and a temperature of 150° C. At shorter cure times, the molecular layer is thicker and not as well cured, and it forms a weak boundary layer between the aluminum surface and the adhesive. At lower concentrations, the titanate does not form a continuous layer across the surface, and the reaction of the coupling agent with the surface is faster than the reaction of the coupling agent with itself. This can lead to the formation of discrete islands of the coupling agent on the surface which provides points where the adhesive can adhere to the surface.

A similar set of examples is prepared using silane coupling agents. The only difference as compared to the titanate coupling agents discussed above is that the metal center is changed from titanium to silicon. The other variables of polymer concentration, cure time and cure temperature remain the same.

Figure 7:
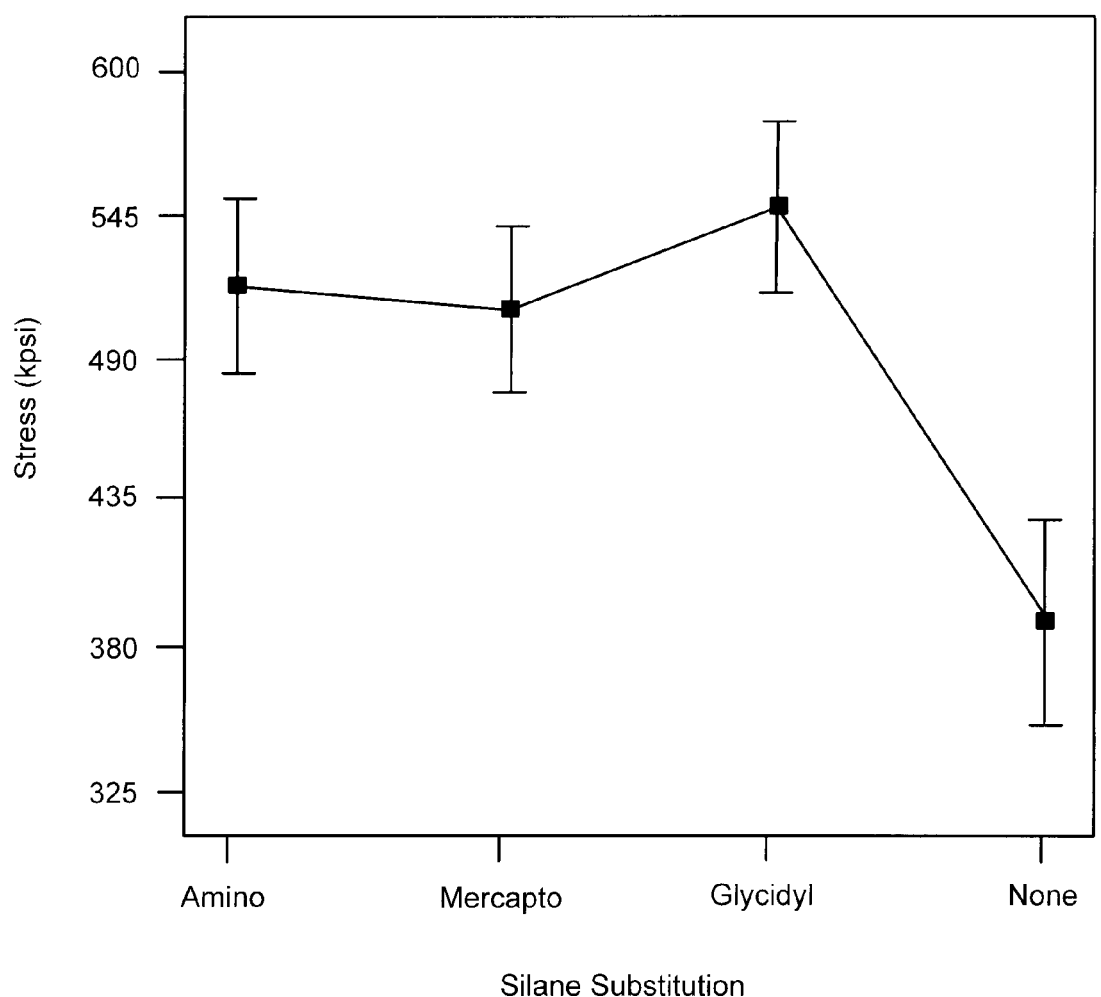
FIG. 7 illustrates the adhesive stress of an encapsulating coating as a function of the coupling agent.

FIG. 7 illustrates that all of the silane coupling agents produce higher adhesion values than the untreated control sample. The silane coupling agents also have a lower variance with respect to adhesion values, which would produce more consistent coated components.

Similar to the titanate coupling agents, cure time is relatively insignificant but the cure temperature is significant. This means that a minimum temperature (85° C.) is required to cure the silane, but once at that temperature, the reaction is essentially instantaneous.

One advantage of the present invention is that the coated components can be re-worked after initial assembly of the device, including subsequent washing of the components. To determine the affect of multiple aqueous washings on the coupling agent, aluminum test pieces are coated with the amino propyl titanate and are subjected to multiple aqueous washings. The contact angle is measured after each washing.

Figure 8:
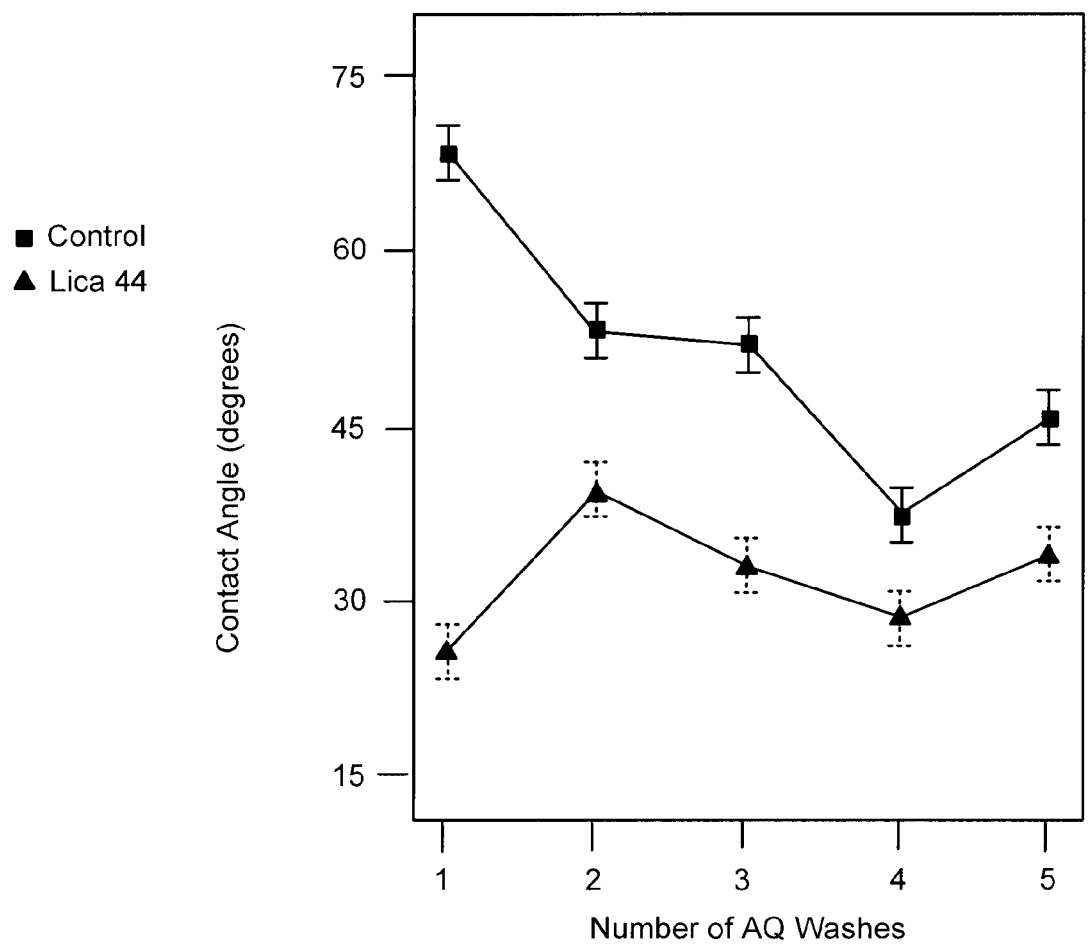
FIG. 8 illustrates the contact angle of an aluminum surface as a function of the number of aqueous washes.

FIG. 8 illustrates that the surface treated with amino propyl titanate (Lica 44) starts with a lower contact angle indicating a higher surface energy than the untreated control sample. The higher surface energy would result in better bonding of the encapsulating coating. After aqueous washing, the control sample has a lower contact angle indicating that the surface has been cleaned. The treated surface has an increasing contact angle indicating that the aqueous wash system is possibly contaminating the surface. However, the treated surface maintains a lower contact angle than the untreated surface through 5 aqueous washings. After the initial increase in contact angle, the treated surface retains the same surface energy showing that the coating remains on the surface. Given that the treated surface can withstand multiple aqueous washings, there is a lower risk that the coating will be removed during normal handling operations or re-working of the device.

Figure 9:
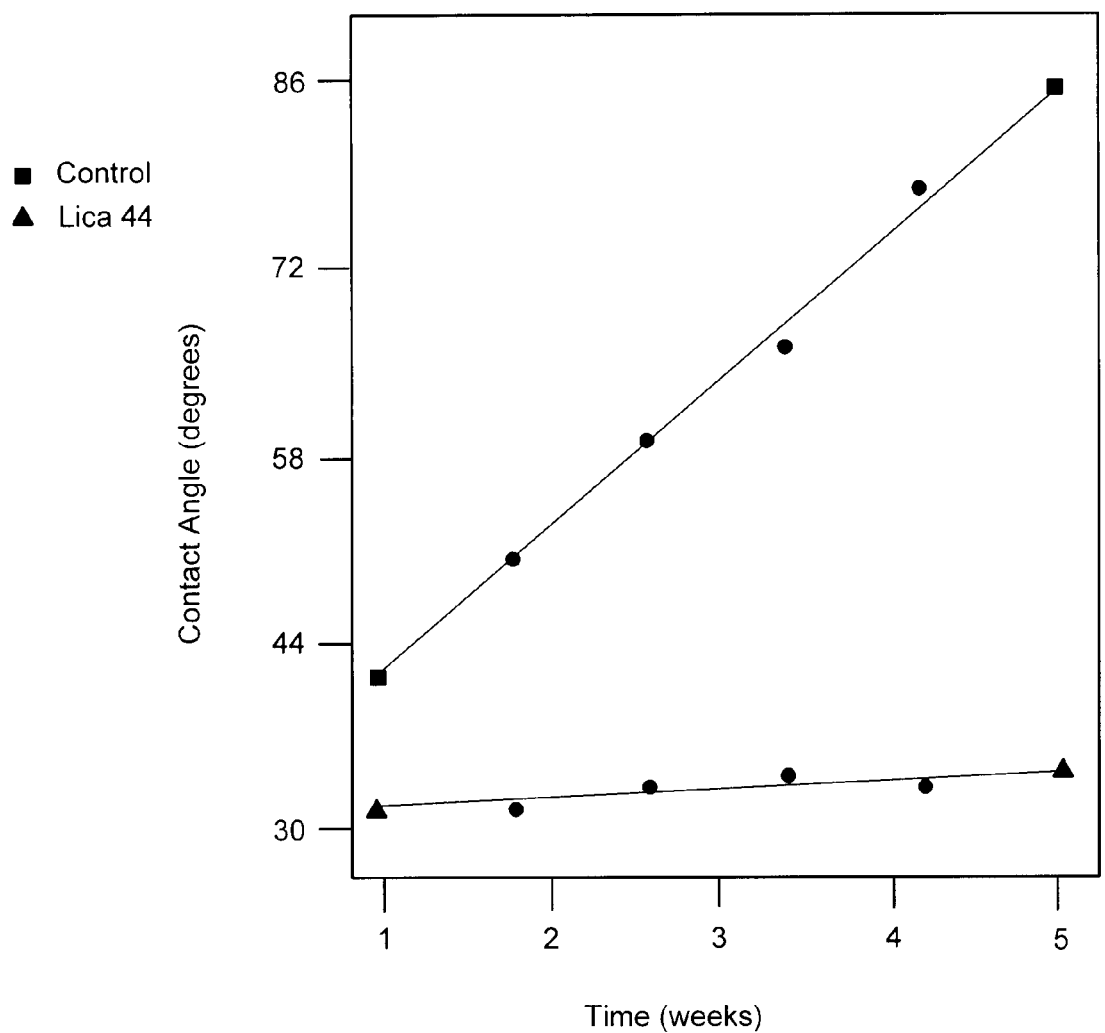
FIG. 9 illustrates the contact angle of an aluminum surface as a function of time.

To evaluate the affect of ambient conditions over time, aluminum test pieces are coated with amino propyl titanate (Lica 44), are stored in a plastic tray and the contact angle is measured weekly. FIG. 9 illustrates that the treated aluminum piece maintains the same surface energy over the five week period of the test The untreated aluminum immediately begins to decrease in surface energy. This decrease can be caused by oxidation of the aluminum and the accumulation of organic contamination from the environment. This demonstrates that treatment with a metal alkoxylate produces a more stable surface.

4. Contamination

With the amino substituted metal alkoxylate, the amino functionalized versions do not require a cure after coating in order to improve adhesion. However, the overall cleanliness of a component can be dramatically impacted by the addition of a curing step. In this example, an aminopropyl titanate, aminopropyl silane and a control sample are subjected to a battery of cleanliness tests, before and after curing at 150° C. for 30 minutes. These tests include measurement of outgassing and non-volatile residue (NVR).

All the samples have a large contribution to the total outgassing from caprolactam, which is due to the nylon bags in which the components are stored, and the values for total out-gassing with and without caprolactam are listed in Table IV (µg/pc=micrograms per component).

TABLE IV

| Sample | Cure | Total Outgassing (µg/pc) | Outgassing (µg/pc) (w/o caprolactam) |
|---|---|---|---|
| Control | No | 0.58 | 0.48 |
|  | Yes | 0.14 | 0.03 |
| Aminopropyl titanate | No | 1.89 | 1.27 |
|  | Yes | 0.14 | 0.03 |
| Aminopropyl silane | No | 0.38 | 0.22 |
|  | Yes | 0.07 | 0.03 |

Aminopropyl titanate with no cure shows a high total outgassing than the other samples. The main contributors to the total are lower amino compounds (64%). There are no amino compounds found after curing. After curing, all of the samples out-gas the same amount with the contributors being various hydrocarbon compounds. The aminopropyl silane does not exhibit any siloxane compounds whether or not the sample is cured.

Table V illustrates the results of extracting Si and Ti by rinsing the components with deionized water to extract the Si and Ti that is not bonded to the surface. The surface of the aluminum test pieces are extracted with deionized water and the extract is analyzed by ICP-MS.

TABLE V

| Sample | Cure | Si (ppb) | Ti (ppb) |
|---|---|---|---|
| Control | No | 203 | 1 |
| | Yes | 439 | 1 |
| Aminopropyl titanate | No | 144 | 338 |
| | Yes | 343 | 54 |
| Aminopropyl silane | No | 8849 | 0 |
| | Yes | 6756 | 0 |

The level of extractable silicon (Si) remains the same whether or not the samples are cured, indicating that the coupling agent is completely reacted at ambient temperatures. The level of titanium (Ti) decreases after the titanate sample was cured indicating that the titanate requires a cure to completely react the metal alkoxylate with itself and the metal surface.

5. Evaluation of Coating Weight

The following examples represent an evaluation of varying coat weight of a perfluorinated siloxane encapsulation coating, and the effect of adding a titanate coupling agent (LICA 38).

Aluminum disk spacers are treated by coating with a perfluorinated siloxane at various concentrations as shown in Table VI and the particle count is measured. Most samples (except CW-2) were run in duplicate, resulting in two measurements for the particle count.

TABLE VI

| Sample | Coating Concentration | Titanate Wash | Particle Count 0.5-1.0 μm | Particle Count <0.5 μm |
|---|---|---|---|---|
| CW-1 | 11.25% | Yes | 4030/2757 | 26637/28599 |
| CW-2 | 0 | Yes | 11658 | 126580 |
| CW-3 | 10 | No | 756/1905 | 6183/6619 |
| CW-4 | 0 | No | 11227/8375 | 99838/123479 |
| CW-5 | 15 | Yes | 1072/2632 | 13027/22722 |
| CW-6 | 15 | Yes | 3541/319 | 22062/25354 |
| CW-7 | 5 | Yes | 5379/6690 | 56011/36782 |
| CW-8 | 5 | No | 804/268 | 12211/18348 |
| CW-9 | 15 | No | 886/925 | 116674/14728 |
| CW-10 | 7.5 | Yes | 1665/2795 | 16721/22320 |
| CW-11 | 3.75 | No | 3015/1455 | 12988/42410 |
| CW-12 | 0 | Yes | 9571/8193 | 101781/88850 |
| CW-13 | 3.75 | Yes | 9409/7686 | 53034/41578 |
| CW-14 | 5 | No | 928/1857 | 16702/12165 |
| CW-15 | 7.5 | No | 580/412 | 12221/10452 |
| CW-16 | 11.25 | No | 306/258 | 7236/3417 |
| CW-17 | 10 | Yes | 3321/4853 | 22169/33318 |

Figure 10:
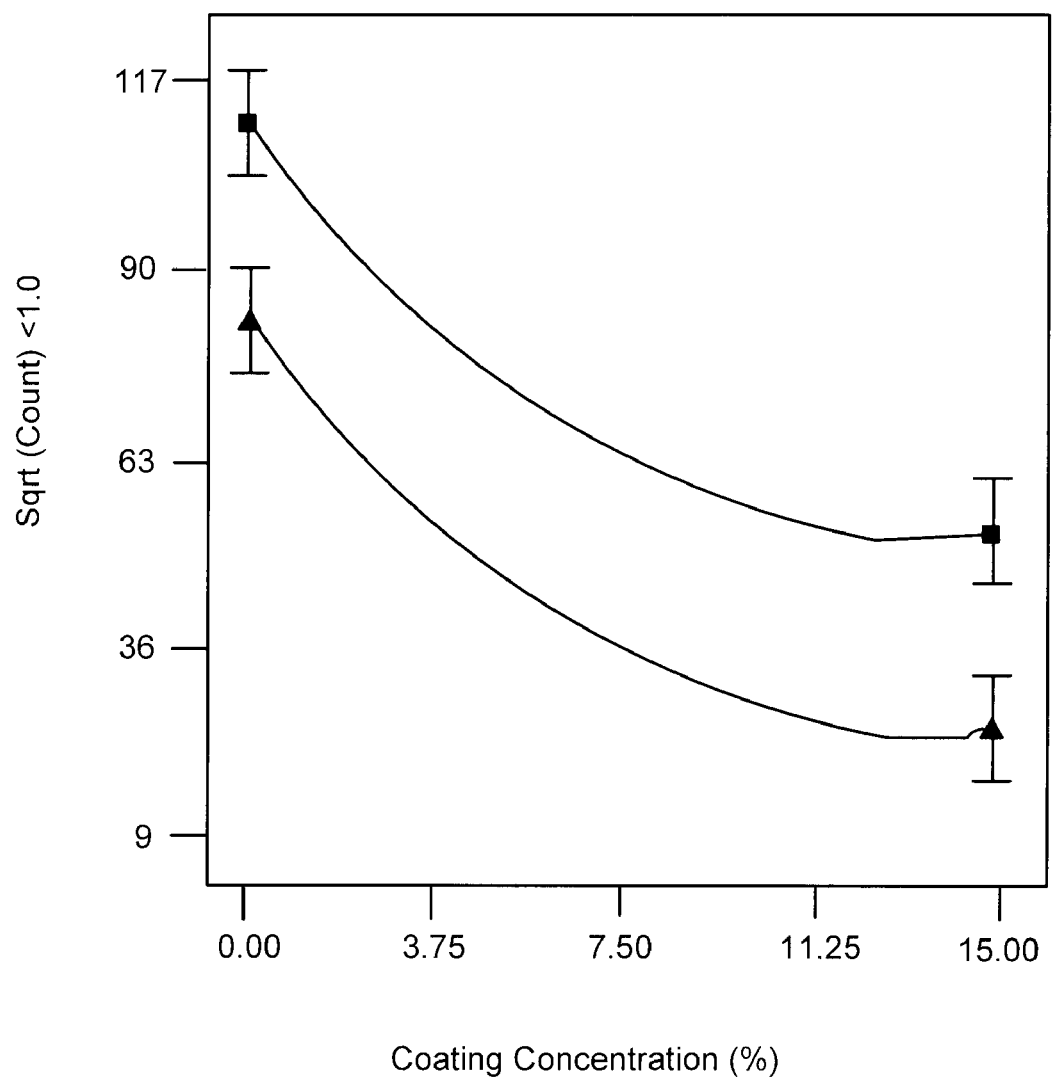
FIG. 10 illustrates particle count as a function of coating concentration.

Because the particle count has a maximum to minimum ratio greater than ten, a square root transformation is used to equalize the variances. The data for particles <0.5 μm is presented in transformed scale in FIG. 10.

The addition of a titanate coupling agent increases the number of particles found on the spacers. The optimal coating solution is 7.5 wt. % of the perfluorinated siloxane in HFE 7100 (a segregated hydrofluorether available from 3M Secialty Materials, St. Paul, Minn.). Increasing the coating concentration does not significantly improve the particle count, and it increases the cost. At coating concentrations below 7.5%, the particle count begins to rise exponentially.

It is also visually observed from scanning electron microscope (SEM) images that the perfluorinated siloxane coating does not form a continuous coating on the spacers at low coatingi weights. The coating fills in the pits or scratches and leaves the peaks exposed, even at a 7.5% coat weight. However, this is sufficient to lower the number of particles. At the very low coat weight of 3.75%, the coating is insufficient to encapsulate particles that are found on the surface.

The titanate wash allows the coating to better wet the surface. At the higher coat weight of 11.25%, puddles are observed on the component that is not washed with titanate. No puddles are observed on the titanate washed component. Even at a concentration of 11.25%, there are still visible peaks on the aluminum component. There are no peaks visible on the titanate washed part.

Outgassing of samples is also measured and the results are illustrated in Table VII.

TABLE VII

| Sample | Concentration | Titanate Wash | Total Outgassing (μg/pc) | Total Outgassing w/o Caprolactam Contribution (μg/pc) |
|---|---|---|---|---|
| OG-6 | 10 | No | 2.1 | 0 |
| OG-8 | 0 | No | 0.1 | 0.02 |
| OG-12 | 15 | Yes | 6.2 | 0.1 |
| OG-14 | 5 | Yes | 2.8 | 0.1 |
| OG-18 | 15 | No | 3.2 | 0 |
| OG-24 | 0 | Yes | 1.2 | 0.06 |
| OG-28 | 5 | No | 1.2 | 0.03 |
| OG-34 | 10 | Yes | 5.4 | 0.05 |

Figure 11:
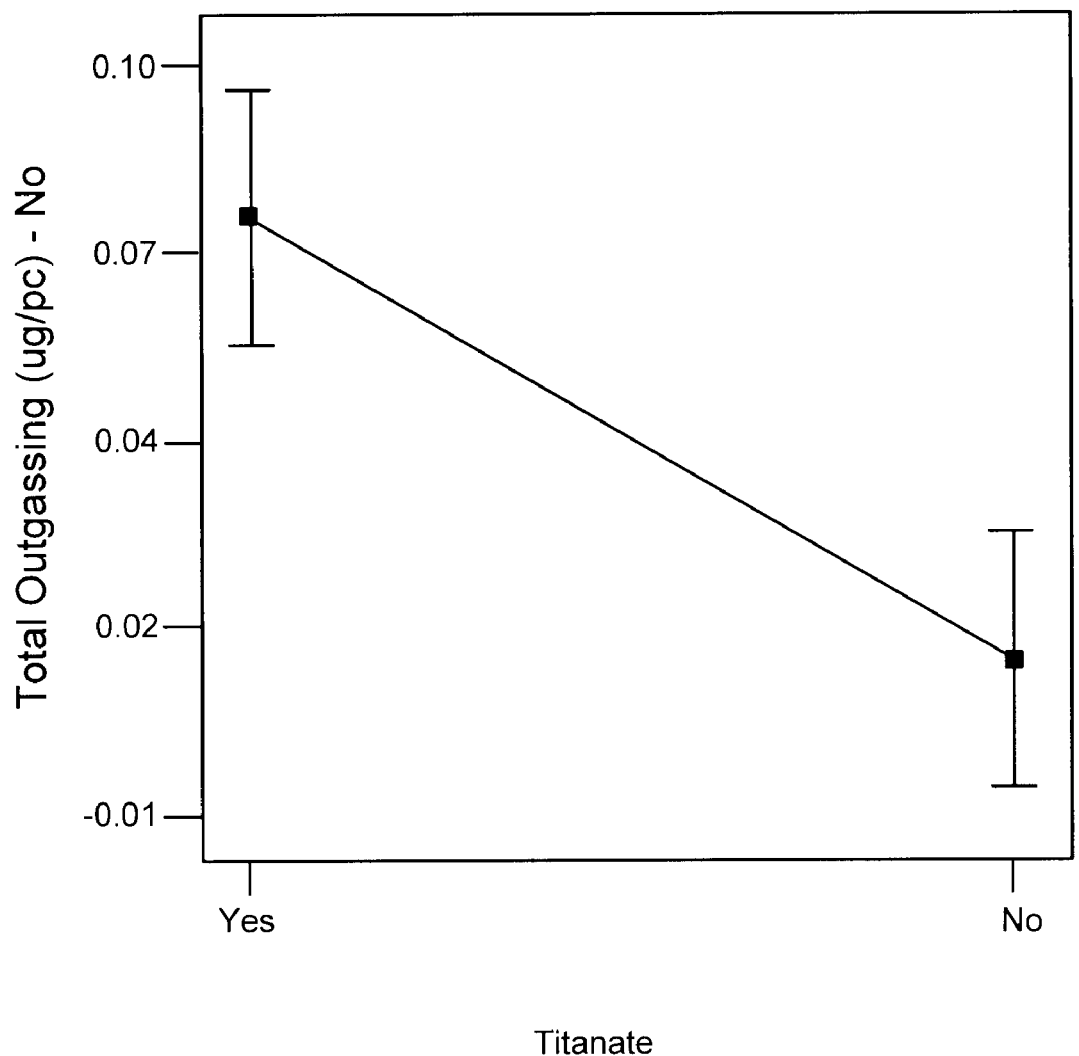
FIG. 11 illustrates the total outgassing as a function of the coupling agent.

The results are also illustrated in FIG. 11. The outgassing numbers reported include a large contribution from caprolactam. It was shown previously that the source of this contaminant is the spacer packaging. Once the contribution of the caprolactam is removed from the total outgassing, the titanate wash is the main factor which contributes to the outgassing of the components. However, the contribution is negligible. With the titanate wash, the parts would be expected to outgas 19+/−19 ng/pc. No siloxanes are detected.

Non-volatile residues are also measured and the results are illustrated in Table VIII.

TABLE VIII

| Sample | Concentration | Titanate Wash | NVR (μg/cm$^2$) |
|---|---|---|---|
| NVR-2 | 11.25 | Yes | 0 |
| NVR-4 | 0 | Yes | 0.5 |
| NVR-8 | 0 | No | 0 |
| NVR-10 | 15 | Yes | 0.1 |
| NVR-16 | 15 | No | 15 |
| NVR-20 | 7.5 | Yes | 0.1 |
| NVR-22 | 3.75 | No | 2.5 |
| NVR-26 | 3.75 | Yes | 0.2 |
| NVR-30 | 7.5 | No | 3.7 |
| NVR-32 | 11.25 | No | 10.4 |

Figure 12:
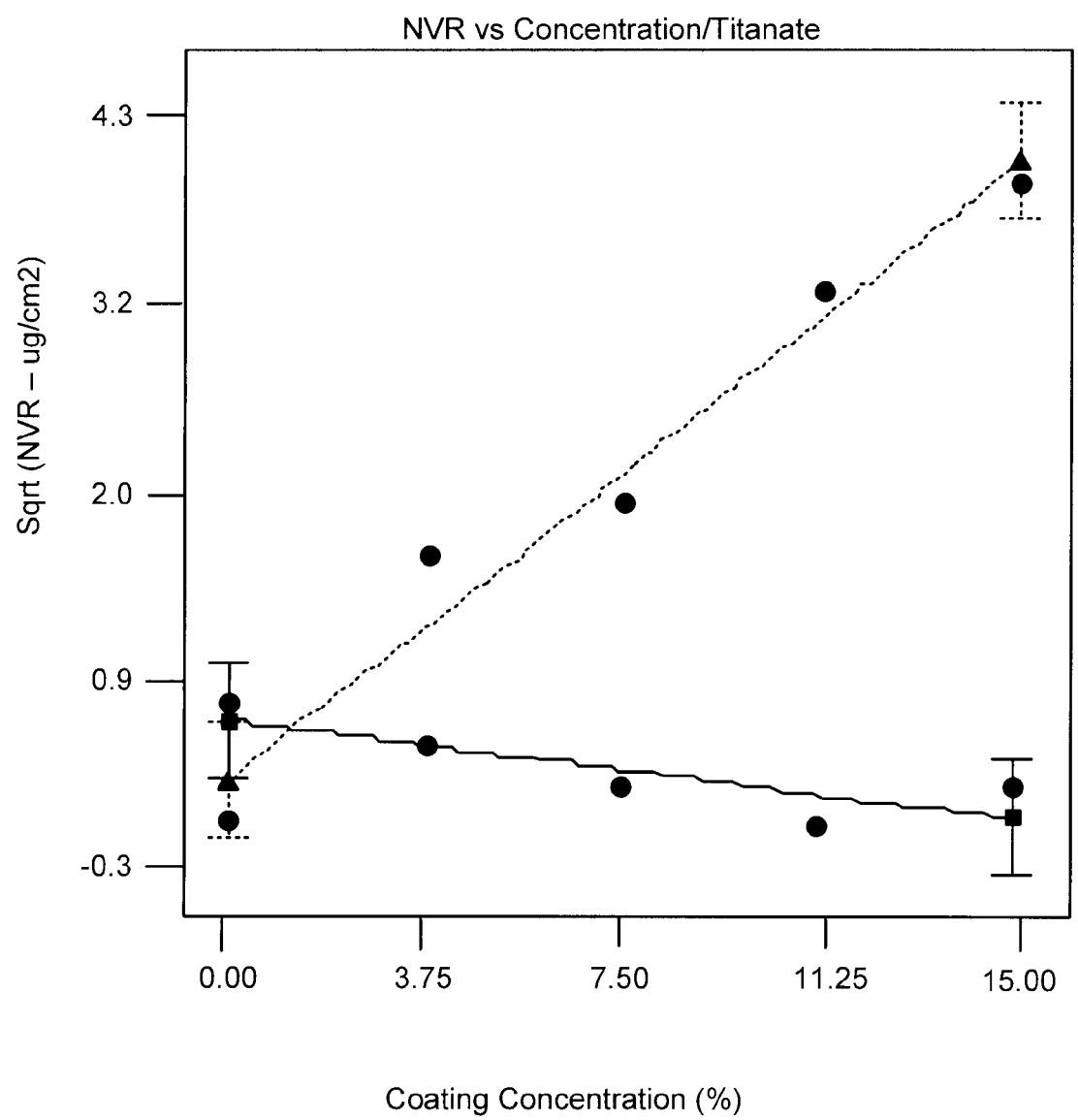
FIG. 12 illustrates the non-volatile residues as a function of coating concentration.

A hydrocarbon ester is identified as the residue on Sample NVR-4. The residue on the other samples, where detected, is identified as a fluoropolymer or the perfluorinated siloxane coating, specifically. Because the NVR values have a maximum to minimum ratio greater than ten, a square root transformation was used to equalize the variances. The data is illustrated in FIG. 12.

The use of a titanate wash improves the adhesion of the coating to the substrate. Without the titanate wash, as the coating concentration increases, the amount of extracted NVR also increases. With the titanate wash, the amount of NVR extracted remains essentially the same irregardless of the coating concentration.

On the uncoated parts, hydrocarbon esters are extracted from the surface. With the coated parts, the extractables were identified as either fluoropolymers or the coating specifically. No siloxanes were detected.

6. Other Silanes

The following examples are prepared to determine if silane coupling agents other than a perfluorinated silane will reduce the particle count.

Figure 13:
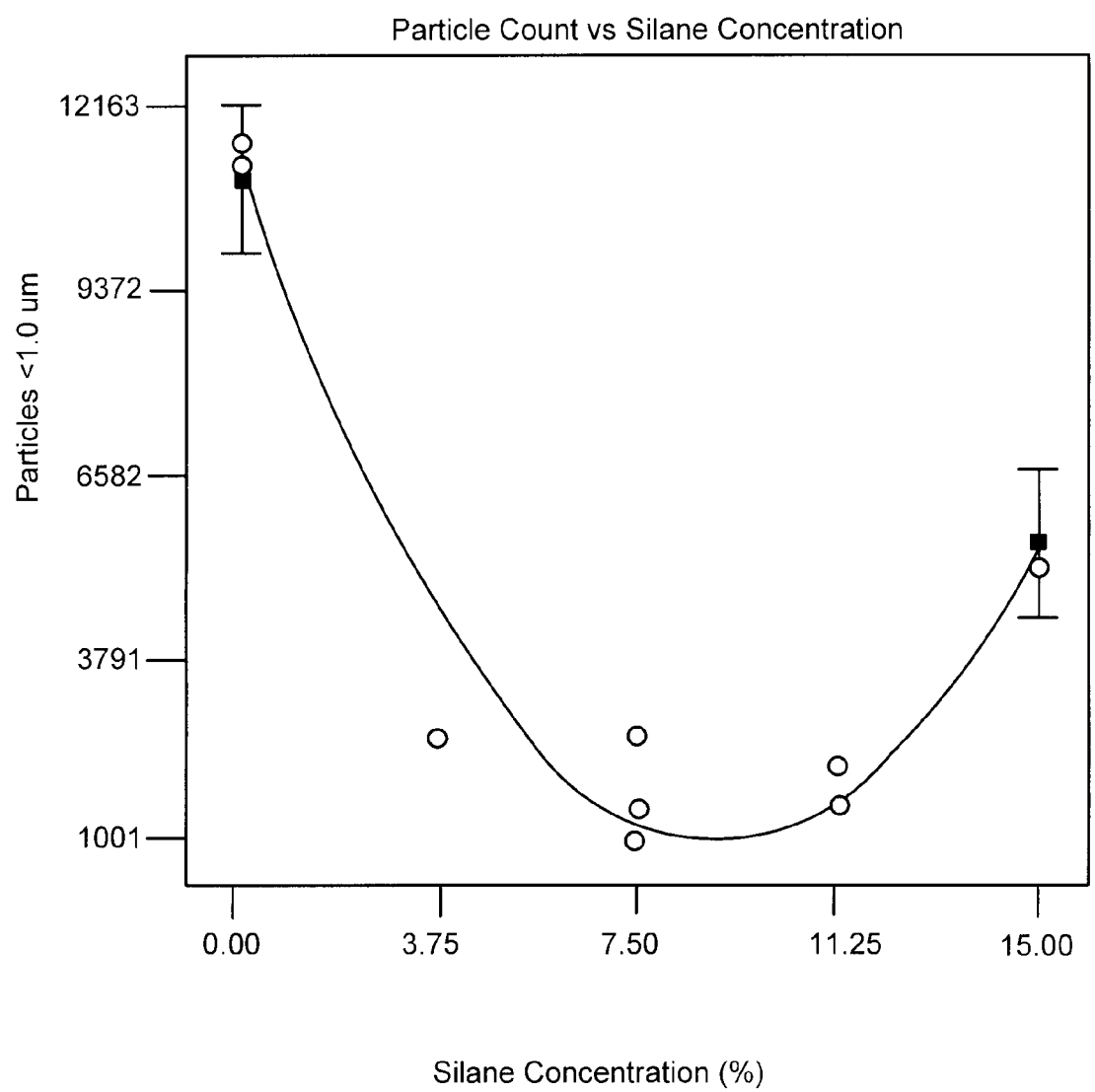
FIG. 13 illustrates the particle count as a function of silane concentration for an encapsulating coating.

Disk spacers are coated with various concentrations of mercaptopropyl triethoxy silane in IPA. The solutions are catalyzed with approximately 10 ml of glacial acetic acid in 100 ml of solution. The solutions are allowed to stand for about 5 min after the addition of the acid, but before the addition of the components. The components are exposed to the catalyzed solutions for about 10 min. After coating, the components are rinsed with IPA, air dried, and cured at 150° C. for 30 min. The particle count results (particles <1.0 µm) are tabulated in Table IX (two measurements per sample) and are illustrated in FIG. 13 for particles 0.5-1.0 µm.

TABLE IX

| Coating Concentration | Particle Count 0.5-1.0 µm | Particle Count <0.5 µm |
|---|---|---|
| Control | 11658 | 123479 |
|  | 11227 | 126580 |
| 1.00% | 4729 | 44118 |
|  | 2139 | 23445 |
| 4.5 | 2557 | 33682 |
|  | 4102 | 39945 |
| 8.00% | 2568 | 28860 |
|  | 1457 | 13718 |
|  | 1001 | 10106 |
|  | 1798 | 15115 |
| 11.50% | 1567 | 14004 |
|  | 2155 | 17748 |
| 15% | 2612 | 20822 |
|  | 5163 | 39379 |

The mercaptopropyl triethoxy silane reduces the particle count of the spacers. This is evidence that the mechanism that is responsible for particle count reduction is the reaction of the metal alkoxylate center, and not the perfluorinated substitution on the metal center.

The amount of particle count reduction is not as high as that observed with the perfluorinated silane. With the perfluorinated silane, the particle count (particles <1.0 µm) was reduced to essentially zero from approximately 10000. With the mercaptopropyl silane, the particle count was reduced to approximately 1000 from 10000. It was shown with the perfluorinated silane that the greatest reduction in particle count occurred with a pH<3.5. In this example, the pH was kept constant by the addition of a constant amount of glacial acetic acid and the pH was not measured. This may be the reason that the particle count reductions are not as great as those seen with the perfluorinated silane.

7. Lubricity

The examples discussed above are concerned with the improvement of the adhesion of an epoxy-based adhesive to aluminum. However, the surface treatment of the present invention can also be used to decrease the surface energy of the component. For applications such as screws, this is a desirable property, since the lubricity of the screw can be increased.

Figure 14:
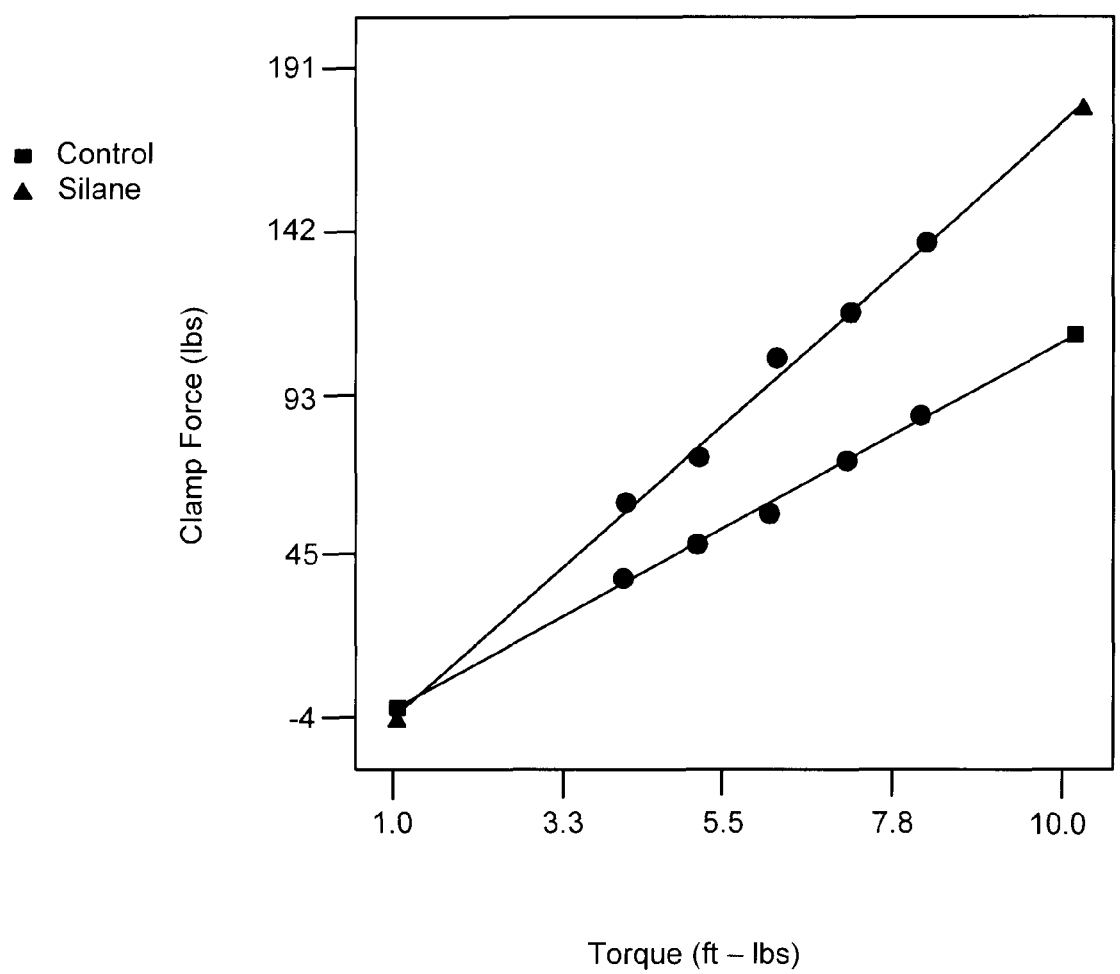
FIG. 14 illustrates the clamp force applied by a screw as a function of torque applied to the screw.

As an example, screws are treated by coating the screws with a 2 percent solution of a perfluorinated octyl trimethoxy silane. The clamp force vs. applied torque is then measured. As is illustrated in FIG. 14, the screw coated with the perfluorinated silane produces more clamp force with less torque applied to the screw.

In a further evaluation, screws are coated with either an oligomeric perfluorinated siloxane coating that is cross-linked by a condensation mechanism or with a perfluorinated silane. Specifically, M3×13 mm metal screws are coated with the oligomeric perfluorinated siloxane coating at levels of 3.75%, 7.5% and 15% coat weights. The samples are air-dried and cured at 150° C. for 30 minutes. The screws are then tested for torque tension. Torque tension testing involves the application of a known torque and measuring the resulting tension on the screw. The slope of the torque versus tension curve is the k-factor. For untreated screws, the k-factor is between about 0.5 and 0.6. As a control, screws coated with nickel polytetra fluoroethylene (Ni-PTFE) were also measured. Ten screws per test condition are evaluated and the average k-factor values for the examples are listed in Table X.

TABLE X

| Ni-PTFE | 3.75% Coat Weight | 7.5% Coat Weight | 15% Coat Weight |
|---|---|---|---|
| 0.204 | 0.214 | 0.200 | 0.192 |

It can be seen that the coating of the present invention advantageously reduces the k-factor. At higher coating concentrations, the coating is also observed to reduce the variation associated with the k-factor. This may be due to the fact that the screw surface is uniformly covered at the higher coating concentrations.

In addition, M3×13 mm screws are coated with perfluorooctyl triethoxysilane at various concentrations. The coating solvent is a 4:1 mixture of isopropynol and water which is adjusted to pH3 with glacial acetic acid. After coating, the samples are air-dried and cured at 150° C. for 30 minutes. The k-factor for these samples is listed in Table XI.

TABLE XI

| Ni-PTFE | 0.25% Coat Weight | 0.5% Coat Weight | 1.0% Coat Weight | 2.0% Coat Weight | 4.0% Coat Weight | 8.0% Coat Weight |
|---|---|---|---|---|---|---|
| 0.204 | 0.248 | 0.250 | 0.295 | 0.394 | 0.477 | 0.314 |

The perfluorinated silane does not reduce the k-factor at the lower coat weight levels. At 8% coat weight, there was an indication the k-factor was beginning to decrease. However, at this level, the coating has not completely covered the part surface and the peaks of the surface roughness features are still exposed. It can be concluded that to see a beneficial effect from these coatings, the entire surface must be covered.

In a further test, M3×13 mm screws are coated with a perfluorinated silane and a silyl amide. Solutions of 15% perfluorinated triethoxy silane in isopropyl alcohol are prepared. The pH is adjusted to a value between 3 and 4 with glacial acetic acid. A perfluorinated polyether that had been terminated with a silyl amide group (PFPE) is added at 1%, 2% and 3% levels based on total solids in a solution. A silane solution with no added PFPE is tested as a control sample. The solution is allowed to stand for ten minutes. The screws are added to the solution and allowed to soak for ten minutes. The solutions are drained and the screws are rinsed and cured at 150° C. for 30 minutes.

The clamping force versus torque curves are generated and the k-factors are listed in Table XII.

TABLE XII

| Ni-PTFE | 0% PFPE | 1% PFPE | 2% PFPE | 3% PFPE |
|---------|---------|---------|---------|---------|
| 0.195   | 0.411   | 0.269   | 0.237   | 0.219   |

The addition of PFPE to the perfluorinated silane coatings lowers the k-factor to a level that is comparable to Ni-PTFE coated screws. The higher levels of PFPE show the greatest drop in the k-factor values. Further, the higher PFPE levels show a decrease in the variance associated with the k-factor.

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. A method, comprising the steps of:
providing a component having at least a first surface and a recessed surface feature that is recessed with respect to the first surface; and
applying a polymer encapsulating coating to the component so that the coating deposits within the recessed surface feature to encapsulate at least a portion of contaminant particles accumulated therein, said coating deposited on less than the entire said first surface to which the coating is applied, said polymer selected from the group consisting of a perfluorinated polymer, an epoxy functional polymer and a vinyl functional polymer.

2. A method as recited in claim 1, wherein said component is a disk drive component.

3. A method as recited in claim 1, wherein said surface is selected from the group consisting of a metallic surface, an aluminum surface, a ceramic surface and a plastic surface.

4. A method as recited in claim 1, wherein said surface is a metallic surface and said particles are selected from the group consisting of metallic particles and metallic oxide particles.

5. A method as recited in claim 1, wherein said particles have a size of not greater than about 1 µm.

6. A method as recited in claim 1, wherein said particles have a size of not greater than about 0.5 µm.

7. A method as recited in claim 1, wherein said polymer chemically bonds to said surface.

8. A method as recited in claim 1, wherein said coating step comprises:
applying a monomer to said surface; and
polymerizing said monomer on said surface.

9. A method as recited in claim 1, wherein said method further comprises the step of applying a coupling agent to said surface before said coating step, said coupling agent covalently bonds to said surface.

10. A method as recited in claim 1, wherein said component further has a plurality of recessed surface features, and said coating deposits within at least a portion of said recessed surface features to encapsulate at least a portion of said particles.

11. A method as recited in claim 10, wherein said coating deposited within said recessed surface features encapsulates a majority of said particles.

12. A method as recited in claim 1, wherein said component has a plurality of recessed surface features, and said coating deposits only within said recessed surface features.

13. A method as recited in claim 1, wherein said particles have substantially similar material composition as said surface.

14. The method as recited in claim 1, wherein said particles preferentially segregate within said recessed surface feature.

15. The method as recited in claim 1, wherein said recessed surface feature is characterized as a scratch induced during the processing step.

16. The method as recited in claim 1, further comprising a step of washing the component in a fluid prior to the applying step, wherein the contaminating particles are retained in the recessed surface feature after said washing.

17. A method for encapsulating particles on a disk drive component, comprising the steps of:
washing a disk drive component in a fluid so that particles having a size of not greater than 0.5 µam are dispersed thereon; and
coating a recessed surface feature formed in a first surface of the washed disk drive component with a polymer to form an encapsulating coating so that at least about 75 percent of said particles are encapsulated within the recessed surface feature by said encapsulating coating, the coating deposited on less than the entire said first surface to which the coating is applied, the coating characterized as a cross-linked coating.

18. A method as recited in claim 17, wherein said disk drive component is selected from the group consisting of a disk spacer, an actuator flex assembly, an E-block, a disk clamp and a screw.

19. A method as recited in claim 17, wherein said polymer is selected from the group consisting of a perfluorinated polymer, an epoxy functional polymer and a vinyl functional polymer.

20. A method as recited in claim 17, wherein said method further comprises the step of applying a coupling agent to said surface before said coating step, said coupling agent is selected from the group consisting of a metal alkoxylate compound, a surface active agent and a tungstic acid derivative, said coupling agent covalently bonds to said surface.

21. A method as recited in claim 17, wherein at least 95 percent of said particles are encapsulated by said polymer.

22. The method as recited in claim 17, wherein said coating step further comprising supplying a solvent selected from the group consisting of isopropanol, ethanol, and a fluorinated solvent.

23. The method as recited in claim 17, wherein said recessed surface feature is characterized as a scratch induced during handling of the component.

24. A method for encapsulating particles on a disk drive component, comprising the steps of:
washing a disk drive component in a fluid so that particles having a size of not greater than 0.5 µm are dispersed thereon; and
coating a recessed surface feature extending into the washed disk drive component with a polymer to form an encapsulating coating so that a majority of said particles are encapsulated within the recessed surface feature by said encapsulating coating, the coating deposited on less than an entire outer surface of said component, said polymer selected from the group consisting of a perfluorinated polymer, an epoxy functional polymer and a vinyl functional polymer.

25. The method as recited in claim 24, wherein said polymer chemically bonds to said surface.

* * * * *